(12) United States Patent
Cali et al.

(10) Patent No.: US 11,055,524 B2
(45) Date of Patent: Jul. 6, 2021

(54) DATA EXTRACTION PIPELINE

(71) Applicant: ONFIDO LTD, London (GB)

(72) Inventors: Jacques Cali, London (GB); Peter Roelants, London (GB); Christos Sagonas, London (GB); Romain Sabathe, London (GB)

(73) Assignee: ONFIDO LTD, London (GB)

( * ) Notice: Subject to any disclaimer, the term of this patent is extended or adjusted under 35 U.S.C. 154(b) by 174 days.

(21) Appl. No.: 16/245,480

(22) Filed: Jan. 11, 2019

(65) Prior Publication Data
US 2019/0220660 A1 Jul. 18, 2019

(30) Foreign Application Priority Data

Jan. 12, 2018 (EP) .................................... 18151489

(51) Int. Cl.
*G06K 9/00* (2006.01)
*G06F 16/35* (2019.01)
*G06N 3/08* (2006.01)

(52) U.S. Cl.
CPC ......... *G06K 9/00456* (2013.01); *G06F 16/35* (2019.01); *G06K 9/00442* (2013.01); *G06K 9/00463* (2013.01); *G06N 3/08* (2013.01); *G06K 2209/01* (2013.01)

(58) Field of Classification Search
None
See application file for complete search history.

(56) References Cited

U.S. PATENT DOCUMENTS

| 2002/0037097 | A1 | 3/2002 | Hoyos et al. |
| 2010/0293180 | A1 | 11/2010 | Vanderwende et al. |
| 2013/0287284 | A1 | 10/2013 | Nepomniachtchi et al. |
| 2016/0125613 | A1 | 5/2016 | Shustorovich et al. |
| 2019/0019020 | A1* | 1/2019 | Flament ............. G06K 9/00463 |

FOREIGN PATENT DOCUMENTS

| EP | 1439485 A1 | 7/2004 |
| EP | 2845147 A1 | 3/2015 |

OTHER PUBLICATIONS

PCT/EP2019/050693, "International Preliminary Report on Patentability", dated Jul. 23, 2020, 17 pages.
EP18151489.4, "Extended EP Search Report", dated Sep. 27, 2018, 17 pages.
EP18151489.4, "Partial European Search Report", dated Jul. 28, 2018, 14 pages.

(Continued)

*Primary Examiner* — Leon Flores
(74) *Attorney, Agent, or Firm* — Kilpatrick Townsend & Stockton LLP

(57) ABSTRACT

A computer-implemented method for classifying a document type of a document in an image and extracting data from the classified document comprising acquiring image data that comprises data relating to at least a part of the document. Textual classification of the document image is then attempted by machine recognition of textual characters to obtain classification data; and using the classification data to classify the document in the image.

17 Claims, 6 Drawing Sheets

(56) References Cited

OTHER PUBLICATIONS

Harley, et al., "Evaluation of Deep Convolutional Nets for Document Image Classification and Retrieval", 13th International Conference on Document Analysis and Recognition (ICDAR), Feb. 25, 2015, 9 pages.
Long, et al., "Fully Convolutional Networks for Semantic Segmentation", IEEE Conference on Computer Vision and Pattern Recognition (CVPR), vol. abs/1411.4038v2, Mar. 8, 2015, pp. 1-10.
Wang, et al., "Gated Recurrent Convolution Neural Network for OCR", 31st Conference on Neural Information Processing Systems (NIPS), Mar. 2, 2017, 10 pages.

\* cited by examiner

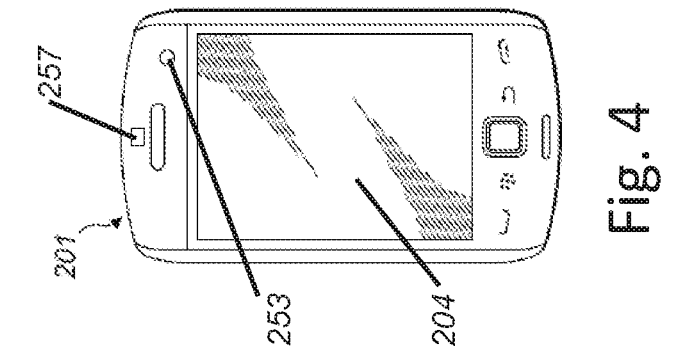
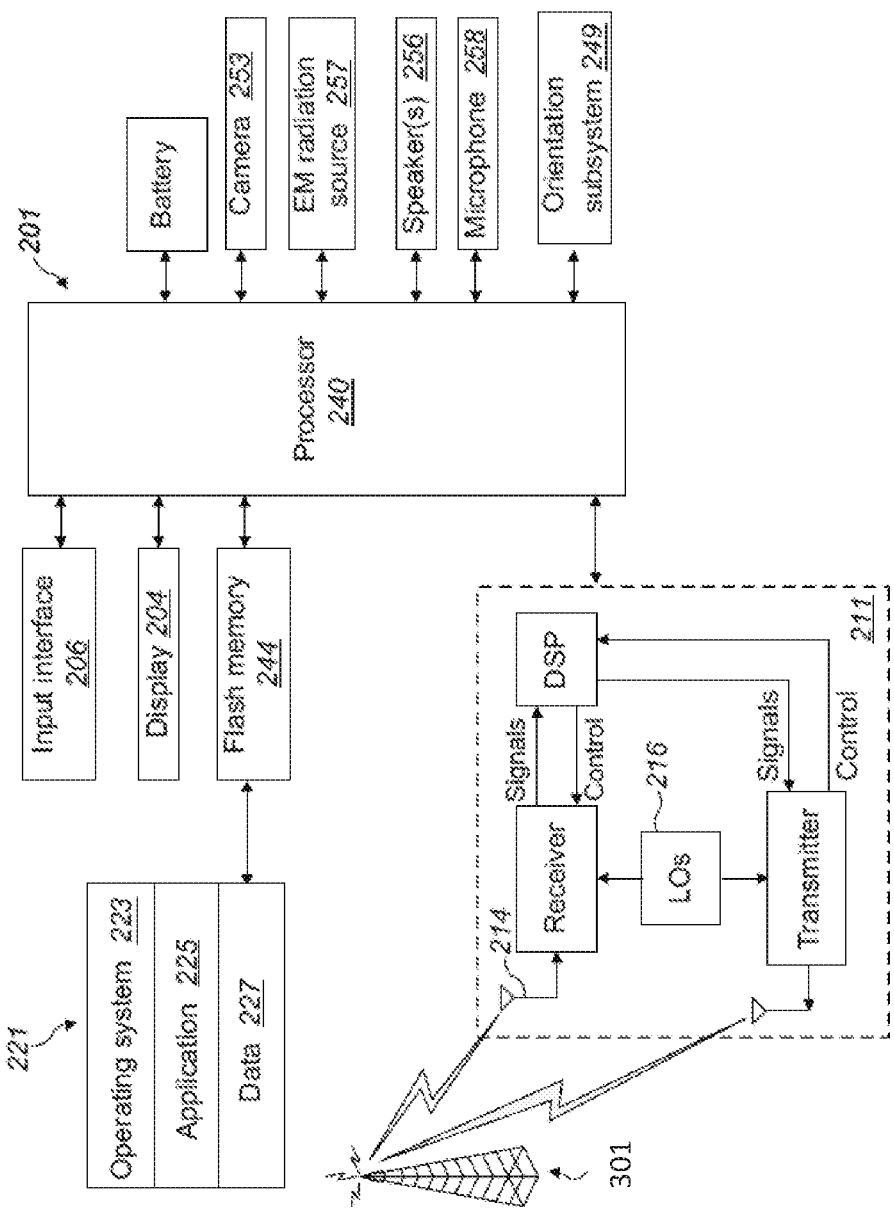
Fig. 4
Fig. 3

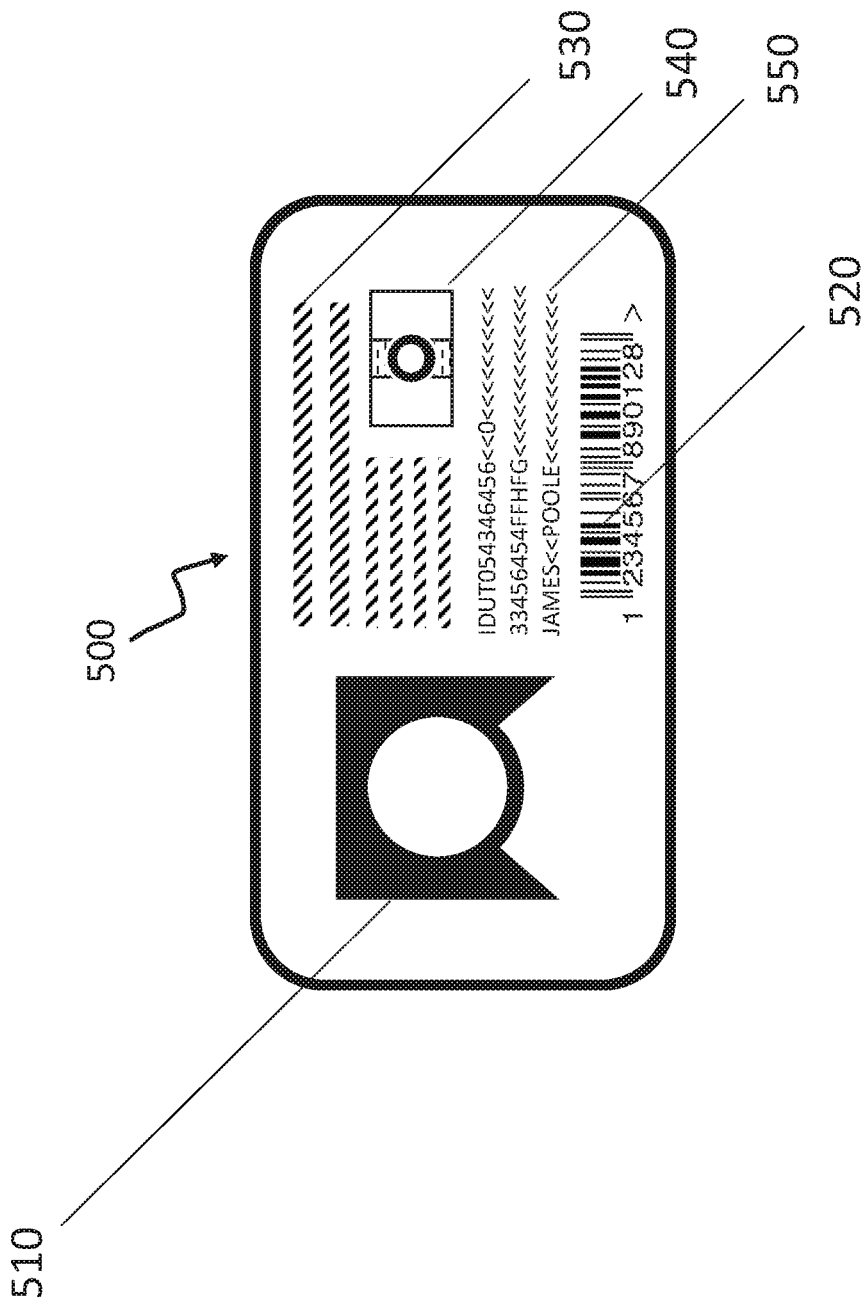

DATA EXTRACTION PIPELINE

CROSS-REFERENCES TO RELATED APPLICATIONS

This application claims priority to European Patent Application Number 18151489.4, filed Jan. 12, 2018.

FIELD OF THE DISCLOSURE

The present disclosure relates to a method to extract data from documents. More specifically it relates to a computer-implemented method for classifying a type of a document in an image and extracting data from the classified document.

BACKGROUND OF THE INVENTION

Official documents are often used to verify the details of people. This is typically done manually. For example, a representative of a car rental company may check a customer's driving license before authorizing the rental of a car to the customer. Such checking implicitly requires manual verification of the presented documents and extraction of the data contained therein. Manual verification and extraction is a skilled and labour intensive process that leads to uncertainty and processing bottlenecks. For this reason, various techniques have been developed to automate aspects of this process.

One example is the use of computers to extract document data using optical character recognition (OCR) from scanned images of official documents. However, the efficiency of such methods is limited by a variety of factors. For example, the acquired images may be poor quality or the official documents may be damaged or tampered with in some way. Additionally, there may be a large number of official documents, with different structures of data, which may be presented for consideration. Automated data extraction from official documents is therefore a formidable computational challenge. Consequentially, typically, it is difficult to have confidence in automated data extraction results compared to the equivalent manually obtained results.

The computational challenge in extracting the data can be greatly reduced if the type of the official document is known. This is because a known type of document will generally be formatted and structured according to an official template, which will provide the expected type, location, and structure of data. Knowing the type of a document therefore provides the data extraction process with prior knowledge of what is expected to be present in an image of the document. As data extraction comprises matching of characters to the processed image, such prior knowledge limits the range of possibilities and ensures better performance of the data extraction process.

The ideal data extraction program would be able to extract data from and verify any type of official document. However, the number of official documents that may be presented for consideration is vast. This is clear by considering that most countries issue unique passports, birth certificates, driving licenses, etc. which will all likely have changed in form over time.

Known data extraction programs which cover a large number of official document types have two main issues. Firstly, such data extraction programs are slow, since the program has to check which type of standard template fits the considered document, testing one standard template at a time. Secondly, when there are a limited number of the considered documents or access to a standard template is restricted, it may be impossible to have good confidence that a presented document is of the considered type as opposed to a similar document of a different type, or even a forged document.

BRIEF SUMMARY OF THE INVENTION

The present invention is defined by the independent claims with further optional features being defined by the dependent claims.

According to a first aspect of the invention, there is a computer-implemented method for extracting information from an image of a document comprising: acquiring an image comprising image data relating to at least a part of the document; manipulating the image data to obtain a document image; performing OCR of the image data to produce recognized data; attempting non-textual classification of the document image by machine recognition of non-textual characters to obtain classification data; attempting textual classification of the document image by machine recognition of textual characters to obtain classification data; and using the classification data and recognized data to extract information from the image. The two different classification methods are independent and therefore ensure a robust extraction of information is performed.

Manipulating the image data to obtain a document image may comprises applying a transform to the image data, or cropping the image data to a different size. This ensures that the method can accept image data that has not been acquired under ideal conditions. For example, it may use image data acquired using a camera that is skewed due the angle at which the camera was operated.

The recognized data may comprise recognized textual data and recognized positional data. The recognized textual data may comprise a plurality of textual characters in one or more bounding boxes, and/or the recognized positional data may comprises a position to specify each bounding box. Using OCR helps identify the relevant areas of the official document, which helps reduce the amount of data that is considered, thereby enabling more advanced processing. Additionally, some classification methods, such as machine readable code classification, e.g. barcode classification, do not rely on the OCR results and therefore the OCR data can be used to independently verify the extracted data.

Attempting non-textual classification of the document image by machine recognition of non-textual characters to obtain classification data may comprise attempting machine readable travel document (MRTD) classification of the document image to obtain classification data. MRTD classification may be performed by a process that comprises searching for machine readable zone (MRZ) in the document image and, if a MRZ has been found, obtaining classification data from the set of MRZ lines using OCR. The MRZ is designed to be read by a computer and thus MRTD classification is very fast, and the resultant extracted data can be independently confirmed by OCR results from other parts of the official document. Therefore, this classification method can provide results before other classification methods are complete.

In some cases, attempting non-textual classification of the document image by machine recognition of non-textual characters to obtain classification data comprises attempting machine readable code (MRC) classification, e.g. barcode or quick response (QR) code classification, of the document image to obtain classification data. MRC classification may be performed by a process that comprises searching for a machine-readable code segment in the document image and, if at least MRC segment is found, obtaining classification data from the at least MRC segment. MRC classification is fast and the resultant extracted data can then be independently confirmed by comparison with OCR results from other parts of the document. Therefore, it can provide results before other classification methods are complete. Additionally, some MRC segments can provide a large quantity of data and may have data integrity checking features, such as checksums, to increase confidence in the extracted results.

Attempting textual classification of the document image by machine recognition of textual characters to obtain classification data may comprise keyword classification of the document image to obtain classification data. Keyword classification may be performed by a process that comprises: obtaining the recognized data; retrieving a list of template data; obtaining a weighting matrix using the list of template data; classifying the document to a determined document type using the list of template data and the weighting matrix; and, if a threshold level of confidence in the classification is achieved, obtaining classification data by semantic labelling of the document image. Typically, keyword classification supports classification of more official document types than other classification methods and it can operate even if there is only one example of the official document.

The list of template data may be formed by a process comprising: acquiring at least one document template image; extracting data from each document template image of the at least one document template image, the extracted data comprising an extracted keyword and a position of the extracted keyword; and combining the extracted data associated with each document template image to form the list of template data. This process provides a simple process to let an operator add new official documents to the list of documents that are considered by the keyword classification method.

Optionally, the weighting matrix is a term frequency-inverse document frequency weighting matrix characterizing the difference in term frequency of each extracted keyword relative to a corpus. The effectively provides a linear classifier to classify the official document to which the image data relates. Using a linear classification means that the confidence in the classification can be easily calculated.

Semantic labelling of the document image may be performed by a process that comprises: retrieving standard data of the determined document type, the standard data comprising keywords, keyword positions, and expected data patterns; forming a homography that maps the standard data to the recognized data; identifying additional classification data in the recognized data using the homography; filtering the additional classification data by pattern matching using the expected data patterns; and obtaining classification data comprising the filtered additional classification data. Labelling affects the robustness and performance of the overall system. Therefore, automated methods of labelling, such as semantic labelling, are preferred to increase the robustness of this step.

Preferably, attempting textual classification of the document image by machine recognition of textual characters to obtain classification data comprises convolutional neural network (CNN) classification of the document image to obtain classification data. CNN classification may be performed by a process that comprises: using a deep CNN to classify the document image as a determined document type; if a threshold level of confidence in the classification is achieved, obtaining classification data by semantic labelling of the document image. Given the large number of documents used in the training of the CNN, when the CNN is classifying an official document on which it has been trained, the CNN classification will provide high accuracy. Whilst the CNN classification only supports the document types on which it has been trained, it may also be trained to recognize documents of a type on which it has not been trained as unknown. Therefore, it can report that it does not know about a certain document with a high accuracy.

Attempting textual classification of the document image by machine recognition of textual characters to obtain classification data may comprise visual classification of the document image to obtain classification data. Visual classification may comprise using a visual classifier to classify the document image as a determined document type; obtaining data classification by semantic labelling of the document image. In some cases, the visual classifier comprises using a bag-of-visual-words model using Kaze features and a support vector machine classifier. Relatively small numbers of images of official documents are needed for training a visual classifier. Hence, it generally supports more types of official documents than the CNN.

In some cases, attempting textual classification of the document image by machine recognition of textual characters to obtain classification data is performed if non-textual classification has failed. Since non-textual classification is faster, a process that operates in this manner is more efficient as the slower textual classification are not performed on documents that are successfully classified by non-textual means.

Attempting non-textual classification of the document image by machine recognition of non-textual characters to obtain classification data may comprise, if MRTD classification has failed, attempting barcode classification of the document image to obtain classification data. This order ensures that both fast classification methods are attempted before the textual classification methods.

Attempting textual classification of the document image by machine recognition of textual characters to obtain classification data may be performed by a process that comprises attempting at least one of: keyword classification of the document image to obtain classification data; CNN classification of the document image to obtain classification data; and visual classification of the document image to obtain classification data. The classification method that is selected can be picked according to the needs of a particular document. Multiple classification methods may be used to increase accuracy and confidence in obtained results.

Optionally, attempting textual classification of the document image by machine recognition of textual characters to obtain classification data comprises: attempting keyword classification of the document image to obtain classification data; if keyword classification has failed, attempting CNN classification of the document image to obtain classification data; and if CNN classification has failed, attempting visual classification of the document image to obtain classification data. This has been found to be a particularly efficient order in terms of average processing speed. It also maximises the likelihood that damaged or degraded documents will be corrected assigned as all classification methods are attempted.

Preferably, using the classification data to extract information from the image comprises extracting the information that the document in the image is not classified if all attempted classification methods have failed. This enables communications to the operator or user to advise trying a different authenticity verification method, rerunning the processing, or trying new images of official documents.

The recognized data may comprise a machine-readable code, such as barcode, a QR code or a set of machine readable lines. This ensures the relevant features are quickly, and possibly automatically, identified, and the data contained therein can be read.

According to a second aspect of the invention, there is a computer-implemented method for extracting information from an image of an document comprising: acquiring an image comprising image data relating to at least a part of a document; classifying the image data as comprising a determined document type; using knowledge of the determined document type to extract image data from the document image; segmenting the extracted image data to obtain segmentation data; performing OCR on the segmentation data to obtain recognized data; conditioning the recognized data to obtain classification data; and using the classification data and recognized data to extract information from the image. The second aspect of the invention is more automated and is easier for untrained users to adapt to accommodate a new document. The second aspect of the invention is also more accurate and faster that the first aspect of the invention.

Preferably, classifying the image data as comprising a determined document type comprises using a deep CNN to assign the document image as comprising a determined document type. The use of a single classification method ensures a consistent performance, which makes the system more predictable. Additionally, all documents are thoroughly inspected regardless of type.

Using knowledge of the determined document type to extract image data from the document image may be performed by a process that comprises: finding a transform to define a bounding box of a template of the determined document type in the document image. The transform may comprise a rotation or scaling of the determined document image relative to the document image axes. This ensures that the method can accept image data that has not been acquired under ideal conditions. For example, it may use image data acquired using a camera that is skewed due the angle at which the camera was operated.

Segmenting the extracted image data to obtain segmentation data may be performed by a process that comprises: searching the extracted image data to find at least one text field; associating a label with each of the at least one text field; obtaining segmentation data from the extracted image data, the segmentation data comprising the position of each of the at least one text field and the associated label; returning the segmentation data. Generally, segmenting the extracted image data to obtain segmentation data comprises using per pixel based segmentation. Preferably, segmenting the extracted image data to obtain segmentation data comprises using a deep CNN. Semantic labelling thereby quickly identifies the relevant sections of the document and automatically identifies the reason for their importance.

Performing OCR on the segmented data may comprise: cropping the image data using the segmentation data; recognizing text in the cropped image data; obtaining recognized data, the recognized data comprising the position of the cropped image data and the recognized text. Recognizing text in the cropped image data comprises using prior knowledge about the determined document type. The performance of the OCR is assisted by the prior knowledge to help return the most likely text for a given field, thereby improving the performance and accuracy of the OCR.

Recognizing text in the cropped image data may comprises using a recognizing network comprising a deep CNN with long short-term memory (LSTM) network layers on top.

Optionally, the recognizing network has been trained with connectionist-temporal-classification as a cost function. The recognizing network inference is done via beam-search.

Typically, conditioning the recognized data comprises removal of special characters, or standardizing the format of the elements of the recognized data. This prevents data contamination of any system using the extracted data results.

In some embodiments, there may be a first set of steps; and a second set of steps, wherein documents are processing according to the first set of steps, or start being processed according to the first set of steps but, before the step of manipulating the image data to obtain a document image, are switched and processed according to the second set of steps. The decision to switch processing methods can be made according to difficulty of classification, in response to processing load, or as required by a user.

Preferably, acquiring an image comprising image data comprises at least one of: loading a file; taking a photograph; scanning an image; and receiving an image. Thus, all common methods of acquiring image data are supported increasing the versatility of the method.

If classification data has been obtained and a document type determined, the classification data may be validated by a process comprising comparing the classification data with standard data of a document of the determined document type. Validating the classification data by comparing the classification data with standard data of a document of the determined document type may comprise: summing the number of elements of the classification data; comparing the number of elements of the classification data to the number of elements of the standard data; and validating if the number of elements is the same.

Validating the classification data by comparing the classification data with standard data of a document of the determined document type may comprise: comparing the structure of each of the elements of the classification data to the corresponding element of the standard data using regular expressions; validating if the structures are the same.

The computer-implemented method may further comprise consistency checking the classification data formed by non-textual classification, the consistency checking comprising: OCR of the image data to produce recognized data; and consistency checking the classification data using the recognized data. Preferably the results of all classification method are consistency checked. Consistency checking of any of the non-textual classification method provides an independent check that ensures that the non-textual classification has provided plausible information. Consistency checking the textual classification also ensures that the complex processing has not formed erroneous information.

Consistency checking may further comprise: comparing the obtained classification data with the recognized data to ensure they satisfy a threshold of similarity; and if the threshold of similarity is satisfied, declaring the consistency check to be passed. The threshold of similarity may be set so that the obtained classification data comprises a set number of elements of the recognized data or a decoded form of the recognized data. The consistency check thereby confirms that the official document that the image data relates to was classified and processed correctly.

In some embodiments, there is a computer-readable medium comprising executable instructions for performing the above-described method.

In some embodiments, there is a computer comprising a processor configured to execute executable code stored in memory, wherein the executable code comprises instructions for performing the above-described method.

BRIEF DESCRIPTION OF THE DRAWINGS

The present disclosure is made by way of example only with reference to the accompanying drawings in which:

FIG. 3 is a front view of an electronic device that may operate according to the present invention;

FIG. 4 is a schematic diagram of components of the electronic device that may operate according to the present invention;

FIG. 5 presents a block image of an official document;

DETAILED DESCRIPTION OF THE INVENTION

Figure 1:
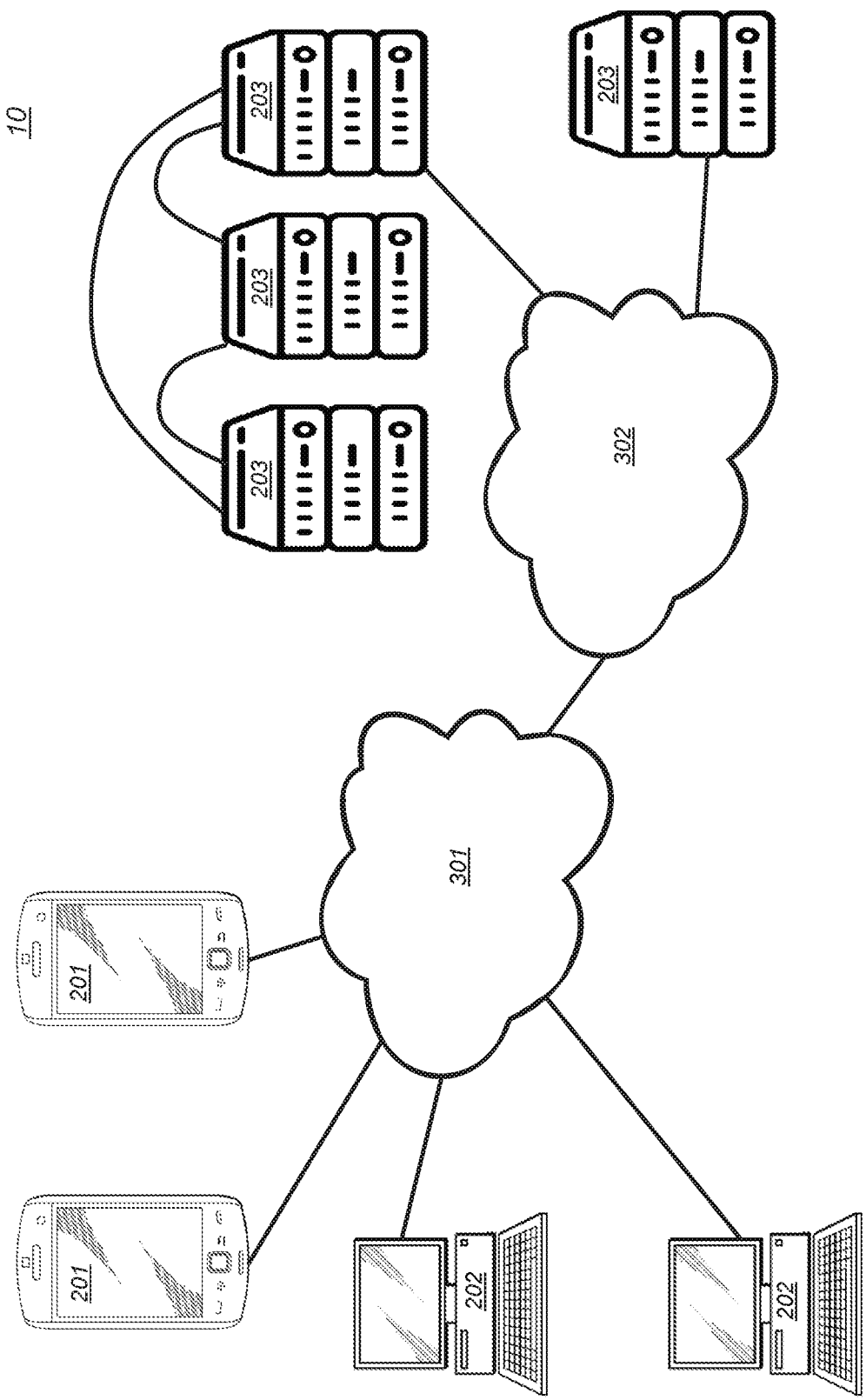
FIG. 1 is a component diagram of a system that may be used to implement the present invention.

FIG. 1 shows a system 10 in which according to one embodiment the invention is implemented. The system comprises electronic devices 201, 202, including mobile electronic devices 201, fixed location electronic devices 202 and servers 203. The electronic devices are in communication with at least one communication network 302 (which may include, but not necessarily include wireless network 301). Data may be communicated between the electronic devices. The at least one communication network may comprise the internet, The wireless network may for example be a cellular or WiFi communication network, or any other conventionally known wireless communication network. The described network architecture is only exemplary and modifications to it, including removing or adding of network components, are possible.

Figure 2:
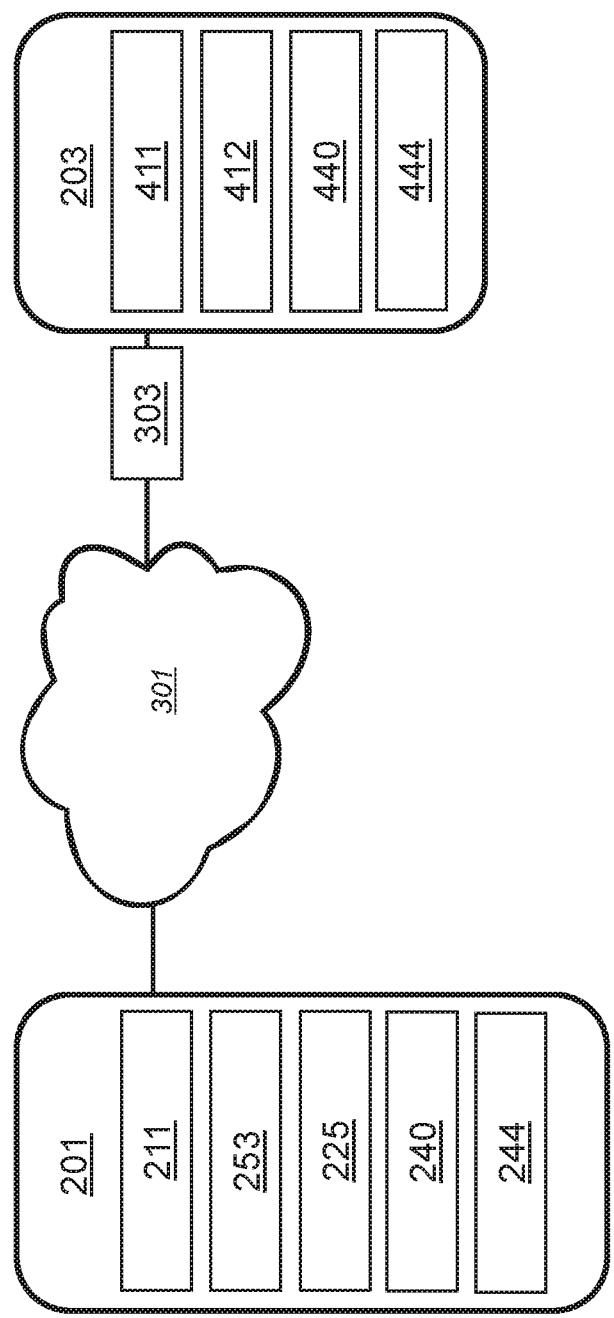
FIG. 2 is a diagram showing components of the system of FIG. 1.

FIG. 2 shows selected aspects of the network system 10 shown in FIG. 1. Specifically, it shows a mobile electronic device 201 in communication, over the wireless network 301, with a server 203. The server 203 is an electronic device that can be accessed across the network 302 by device 201, 202 to perform computational tasks. The mobile electronic device 201 comprises a communication subsystem 211 to enable communication across the wireless network 301. The mobile electronic device 201 further comprises at least one application 225 that can be executed on a processor 240 and a camera 253 that can be used to acquire image data. The image data and applications 255 are stored in memory 244 on the mobile electronic device.

FIG. 2 also shows a server 203 which is connected to the wireless network 301 by a wireless network interface 303 and a network interface 411. The server 203 further comprises applications 412 that can be executed on a processor 440. The server further comprises memory 444 on which the applications 412 and any data that is received from the wireless network 301, and any electronic device connected thereto, can be stored. The server 203 may be distributed and comprise multiple servers, several processors and/or several memory storage locations. Such a distributed server 203 may operate by distributing computational tasks and data across its constitute parts and may communicate with other servers to perform computational operations.

FIGS. 3 and 4 provide further details of the mobile electronic device 201 through which a user may work the invention as described herein. The mobile electronic device 201 comprises a display 204, the camera 253, and an electromagnetic (EM) radiation source 257 for illuminating the area to be imaged with the camera 257. The mobile electronic device 201 is an example of a user electronic device by which a camera 253 may be used to capture image data of an official document 500. This image data may be communicated over the wireless network 301 to the server 203 and stored in the server memory 444.

In the server 203, application software 412 of the stored applications 412 executes on the processor 440 to extract data from the official document 500 to which the image data relates. The result of this extraction may be communicated back across the wireless network 301 to the mobile electronic device 201 and displayed on the display 204 to a user. It will be understood that the system 10 described above is merely an exemplary system 10 for implementing the invention defined herein.

Referring to FIG. 5, an official document 500 may take one of many forms such as a driving license, a passport, a utility or other bill, a birth certificate, a benefits book, an state identify card, or a residency permit. The term official document 500 is therefore intended to cover any document that contains structured information that may be used to verify a person's identity or an aspect relating a person, for example their address.

The official document 500 will comprise at least one feature such as a photo 510, a MRC, e.g. barcode 520, one or more lines of text 530, or a symbol 540 such as a national flag. The text 530 may be positioned in set locations within the official document 500. The text 530 may also be in a particular format and type, possibly including a particular font. The text in each location may also be limited to one or a subset of possible options. As an example, in an exemplary official document, 8 mm in from the left edge and 20 mm down from the top edge may have the term "DRIVING LICENSE" printed in 10 point size of a special font. To reduce the likelihood of counterfeiting, the structuring and format of the official document 500 may be restricted or difficult to obtain.

The official document 500 may be a machine-readable travel document (MRTD), such as a machine-readable passport (MRP), which comprises a machine-readable zone (MRZ) 550. The MRZ 550 comprises information encoded into a series of special characters which may be in the structure and format according to the standards described by International Civil Aviation Organization document 9303. The MRZ 550 is designed to be read by a computer using OCR and enables faster or easier processing of documents than manually assessed passports.

The official document 500 may comprise an MRC, e.g. barcode 520. The MRC, e.g. barcode 520, comprises an image that encodes information. The image is machine-readable by optical scanning. An MRC may be a barcode comprising parallel lines of varying widths and spacing in-between, or it may be a QR code comprising a two dimensional pattern which may use rectangles, dots, and other geometric shapes. An example of a two dimensional barcode is a QR code.

Figure 6:
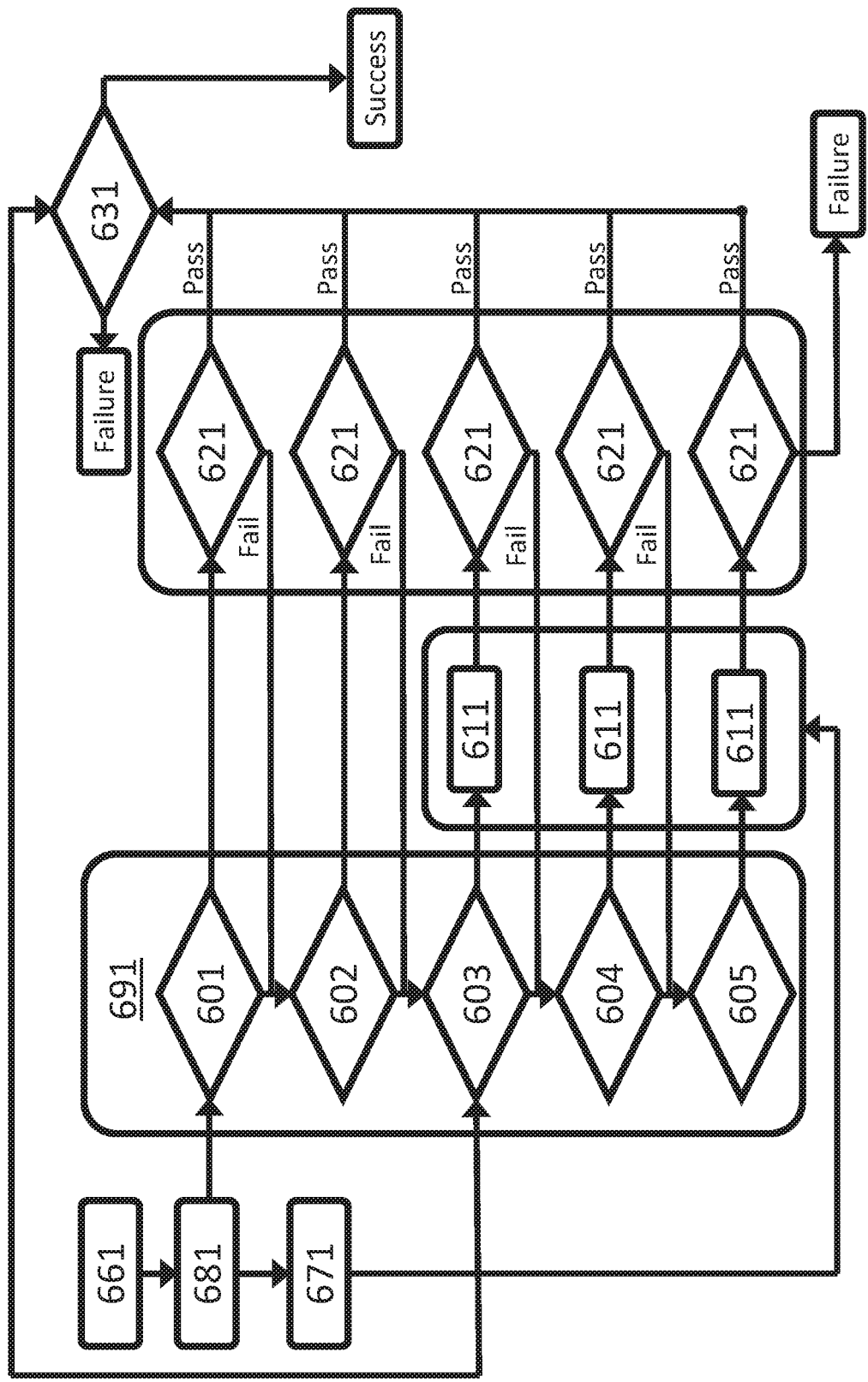
FIG. 6 presents a flow diagram according to the first embodiment of the invention.

Referring to FIG. 6, the data extraction process for a document will now be described. Firstly, an image of an official document is acquired in an input step 661. This acquisition could be by loading a file, taking and/or transferring a photograph, scanning an official document, or receiving and/or loading an image on to a computer. The described processing is thus versatile and not limited to a particular method of acquiring the image data. As an example, image data may be acquired by using the camera 253 of the mobile electronic device 201 to take an image of an official document 500, this data is then communicated to the server 203 for processing using the below described method.

The acquired image may include multiple documents or a document in a background setting. In which case, the subset of the image data relating to the document is selected from the full image data. In other words the image is cropped. The image data or the cropped image data may not display the full side of the official document. For example, a photograph may only display 70% of the front of an official document due to a thumb of a hand holding the document obscuring the remainder of the official document. This is not a problem provided there is enough of the official document visible in the image for the process to identify the official document. What aspects of the official document are necessary for it to be identified as a particular type will depend on the distinctiveness and form of a particular type of official document. For example, identifying the official document may only require one text field to be identified or it may require two, three, or more text fields to be identified.

Before or after cropping, the image data of the image may be rotated, preferably to align the document with the image axis using known methods. The image data may be processed with standard image processing tools to improve the quality of the image and help to distinguish the important features. The image data proceeds to a classification sub-process 691, comprising at least one classification method.

The image data is then also processed by OCR, in a blind OCR step 671. The OCR is performed blind, which means that all text in the image is identified and read without knowing anything about the structure of the text in the image data. The result of the blind OCR process is recognized data.

As part of the identification of text process, one or more bounding boxes containing textual characters are identified. The recognized data therefore comprises the position and size of the bounding boxes as well as any textual characters that have been identified. Textual characters relate to characters, or groups of characters, that are designed to be read by a human. Textual characters may include characters from at least one alphabet, punctuation marks, and may also include symbols that serve as textual character replacements, such as Japanese kanji. Non-textual characters are characters, or a groups of characters, that are not designed to be read by a human. Non-textual characters include groups of characters that are designed to be recognized by machines. Examples of non-textual characters include a MRZ and a barcode.

The image data is then assessed to see if the corresponding document is a MRTD. This is assessed by ascertaining if the document contains MRZ. One method to do this is to check if a pattern of one or more chevrons are present, in one of more lines, as this may indicate that the document is an MRTD.

If the image data is found to relate to a MRTD the system reads the MRZ with the OCR system. Since the data encoded in the MRZ is encoded in a known method, the result of the OCR that is the data that is recognized by the OCR can be decoded to form classification data, which will also reveal the type of the official document. The decoding may include contacting an external database and using the result of the OCR to obtain classification data. Once classification data is obtained, the official document that the image data relates to is thereby classified as a particular type of document. The advantage of doing the MRTD classification 601 first is that it is, by design, a fast and efficient way to read official document and therefore produces a result faster than with other classification and/or data extraction methods.

A validation 621 is then performed to ensure the data from the MRZ has been extracted correctly and to ensure that the official document has been correctly classified. To validate the classification data, the classification data is compared to standard data, or template data, of a document of the particular type. One method by which this is performed is to sum the number of elements in the classification data and compare with the number of elements in the standard data. If these are the same the classification data is said to be valid, and validation 621 is therefore deemed to have completed successfully.

Alternatively or additionally, validation 621 may comprise comparing the structure of each of the element of the classification data to the corresponding element in the standard data. If the structures are the same the classification data is said to be valid, and validation 621 is therefore deemed to have completed successfully.

Due to this separate independent test of the classification, the confidence in the classification data is increased. In this case, the processing of image data can stop. Since MRTD classification 601 is fast by stopping after MRTD classification 601 additional processing can be avoided and thereby the turnover of the classification system can be improved.

If validation 621 fails or if MTRD classification was not possible as no MRZ 150 was identified in the image data, the system will continue processing the image data and will move to Barcode classification.

For barcode classification 602, the image data is assessed to see if the document contains a barcode 520. If at least one barcode is found, the barcode is analysed. Since the data encoded in a barcode 520, is encoded in a known method, the result of the barcode reading is data that can be decoded to form classification data, which will also reveal the type of the official document. The decoding may include contacting an external database and using the coded data to obtain classification data. Once classification data is obtained, the official document that the image data relates to is thereby classified as a particular type of document. Barcode classification 602 is a fast and efficient way to read official document and therefore produces a result faster than with other classification and/or data extraction methods.

A validation 621 is then performed to ensure the data from the barcode has been extracted correctly and to ensure that the official document has been correctly classified. To validate the classification data, the classification data is compared to standard data of a document of the particular type as previously described.

If validation 621 of the barcode classification 602 data fails or if barcode classification 602 was not possible as no barcode 520 was identified in the image data, the system will continue processing the image data.

The MTRD classification 601 and barcode classification 602 may run sequentially in either order or they may run consecutively. The resultant classification data may be compared with other or it may be combined and validated as previously described. Both classifications are relatively fast compared to other classification processes. Therefore, if either or both classifications are successful further processing can be avoided which reduces the computational load to classify an official document thereby improving the rate at which official documents can be classified and classification data extracted.

If barcode 602 and MRTD classification 601 have failed, keyword classification 603 is attempted. MRTD 601 and barcode classification 602 are generally started first because they don't rely on the recognized data from the blind OCR process 671. This means that the blind OCR process 671 can run while these classifiers are processing.

One method of keyword classification 603 comprises analysing example images to form a list of template data. An example image may be an exemplary image of the official document of a particular type or it may be a document specific template, which is a template relating to particular type of official document. The term "word" should be considered as merely as one of, or a group of, textual characters. A keyword is one or more words that are part of the standard format of official document of a particular type, for example, "Passport Number". A keyword may also be a word that is commonly found on official document of the particular type, for example "Expired".

An exemplary process by which the list of template may been formed is as follows. Acquiring at least one document template image, a document template image being an example image of an official document of a first type. The document template image is then processed, preferably using OCR, to extract data associated with the document template. The extracted data may comprise an extracted keyword and a position of the extracted keyword. Preferably the extracted data comprises a plurality of extracted keywords and their positions. Preferably, a plurality of example images of official documents of the first type are processed and the extracted data combined to produce extracted data, as then the extracted data better characterizes official documents of the first type. The extracted data for each document template image are then combined into a list of template data. The list represents a two dimensional array of data. An example of such a list for a driving license, passport and ID card from a particular country might be:

Table 1
Driving License, Name, Address, DOB, Expiry
Passport, Nationality, Name, DOB, Expiry
ID case, Name, Issued The produced list of template data is then used to obtain a weighting matrix, which is a term frequency-inverse document weighting matrix that serves to characterize the difference in term frequency of each extracted keyword relative to a corpus.

The weight matrix is then used as a linear classifier to classify the official document to which the image data relates. Using a linear classification means that the confidence in the classification can be easily calculated. If this confidence is above a threshold, or pre-set level, the official document that the image data relates to is classified as a particular type of document. If this threshold level of confidence is not reached the keyword classification 603 will be considered to have failed and a different classification method will be attempted.

It is easy to add to the list of template data and therefore keyword classification 603 can easily support a lot of different documents. Typically, keyword classification 603 supports classification of more official document types than all the other classification methods and it can operate even if there is only one example of the official document. This is why it generally occurs after MRTD 601 and barcode classification 602. The keyword classifier will also be the first classification attempted documents for those official document on which a barcode 520 and MRZ 540 was not located. The accuracy of the keyword classifier is dependent on the number of keywords in the specific document and how distinct the set of keywords for a specific official document is different from all other documents.

Once a document has been classified by the keyword classification 603 a semantic labelling 611 process is performed to extract classification data. The following is one exemplary description of a process comprising the semantic labelling 611 process. Firstly standard data, from the list of template data, of the official document that the image data relates to is retrieved. The recognized data, from the blind OCR, is then matched with the standard data by searching the recognized data for each keyword from the standard data. An example image of an official document is then retrieved, and a homography calculated between the example image of the official document and the image data. The homography defines the perspective transform, or mapping, between the keywords read by the blind OCR system and the keywords from the example image.

Once the homography has been evaluated semantic labelling 611 can occur. In other words, the homography is used to match other textual data in the recognized data from the blind OCR to the location in the example image, thereby additional classification data is acquired. Pattern based matching, preferably using regular expression, is used to validate the text being matched to the positions in the official document.

A validation 621 is then performed to ensure the data from the keyword classification 603 has been extracted correctly and to ensure that the official document has been correctly classified. To validate the classification data, the classification data is compared to standard data of a document of the particular type as previously described.

If validation 621 of the keyword classification 603 data fails, the system will continue processing the image data. Generally, the next classification method to be attempted is a CNN based classification 604. Preferably, the CNN is a deep CNN. Typically, for each official document of a particular type, the CNN been trained on approximately 4000 images of the official document of the particular type.

Given the large number of documents used in the training of the CNN, when the CNN is classifying an official document on which it has been trained, the CNN classification 604 will provide high accuracy. Whilst the CNN classification 604 only supports the document types on which it has been trained, it may also be trained to recognize documents of a type on which it has not been trained as unknown. Therefore, it can report that it does not know about a certain document with a high accuracy. The CNN may therefore report that a document is not of one of a particular type or not one of a particular group of types, such as known types. The ability to accurately deal with unknown documents is why the CNN classification 604 occurs after the keyword classification 603, which generally cannot assign a document as an unknown type.

The CNN classification 604 follows the same steps as a keyword classification 603. Therefore, the CNN is used to classify the official document that the image data relates to as being a particular type. If a threshold of confidence in the classification has been achieved, semantic labelling 611 of the image data is then performed to obtain classification data.

A validation 621 is then performed to ensure the data from the CNN classification 604 has been extracted correctly and to ensure that the official document has been correctly classified. To validate the classification data, the classification data is compared to standard data of a document of the particular type as previously described.

If validation 621 of the CNN classification 604 data fails, the system will continue processing the image data. Generally, the next classification method to be attempted is a visual classifier based classification 605. Preferably, the visual classifier is a bag-of-visual-words model using Kaze features and a support vector machine classifier. Typically, the visual classifier is trained on approximately 40 or 50 images of the official document of the particular type. Given the lower numbers of images of official documents needed for training, the visual classifier generally supports more types of official documents. As this classifier doesn't know which documents it doesn't know about it always tries to make a classification. For this reason, the visual classifier is generally last.

The visual classification 605 follows the same steps as a keyword classification 603. Therefore, the visual classifier 605 is used to classify official documents that the image data relates to as being a particular type. If a threshold of confidence in the classification has been achieved, semantic labelling 611 of the image data is performed to obtain classification data.

A validation 621 is then performed to ensure the data from the visual classification 605 has been extracted correctly and to ensure that the official document has been correctly classified. To validate the classification data, the classification data is compared to standard data of a document of the particular type as previously described.

The above classification methods, or a subset thereof, can be completed in the described order or in a different order if necessary. The order of MRTD classification 601, barcode classification 602, keyword classification 603, CNN classification 604 and visual classification 605 is described herein as the first processing pipeline 600. The first processing pipeline 600 runs the fastest classification methods (MRTD 601 and barcode classification 602) first, falling back to keyword classification 603 if the faster classification methods fail, then failing back to CNN classification 604 if the keyword classification 603 fails, and finally failing back to the visual classification 605, which never fails to make a classification of the type of official document to which the image data relates.

In addition to the above mentioned advantages, one further advantage of the first processing pipeline 600 is that that experienced users can adapt the system to deal with new document types. To adjust the method to account for a new official document type merely requires a manual process of creating a template of the keyword for the new document, for the keyword classification 603, and retraining the CNN and visual classifiers. This may be part of a processes triggered by the failure of a processed document.

One classification data has been made acquired, a consistency check 631 is performed on the classification data. The consistency check 631 takes the recognized data from the blind OCR 671 and compares it with the classification data. If a threshold of similarity is satisfied the consistency check 631 is said to be passed. Optionally, the threshold of similarity is that the classification data comprises a set number of elements of the recognized data or a decoded form of the recognized data. Optionally, the set number of elements corresponds to all classification data that would be expected to be visible in an official document of the classified type. As an example, consider a passport that is processed by MRTD classification 601 to result in classification data including: the name "Alice", the nationality "British", and the expiry date "13/10/2037". This exemplary classification data would pass a consistency check 631 if the recognized data from the blind OCR comprises the words "Alice", "British", and "13/10/2037".

The consistency check 631 confirms that the official document that the image data relates to was classified and processed correctly. There is always the risk that a document gets misclassified and the processing proceeds to extract erroneous classification data progressing any further. Therefore, the consistency is a simply a check that at least most of the relevant fields have been populated with plausible information.

Generally, if the validation 621 of all classification fails another is attempted until all possible classification methods have been attempted. If all classification methods have been tried, and none have produced classification data that has passed validation 621, the system will typically report data extraction to have failed. If validation 621 has been passed, but consistency checking of the validated classification data fail, the system will typically report data extraction to have failed. Failure may flag the considered document or image for further processing or consideration. The further processing may be manual assessment or further automatic processing. Additionally, the further processing may involve assessing whether the failed document is a new official document type. In some cases, the failure may trigger automatic requests for further documents or images.

Figure 7:
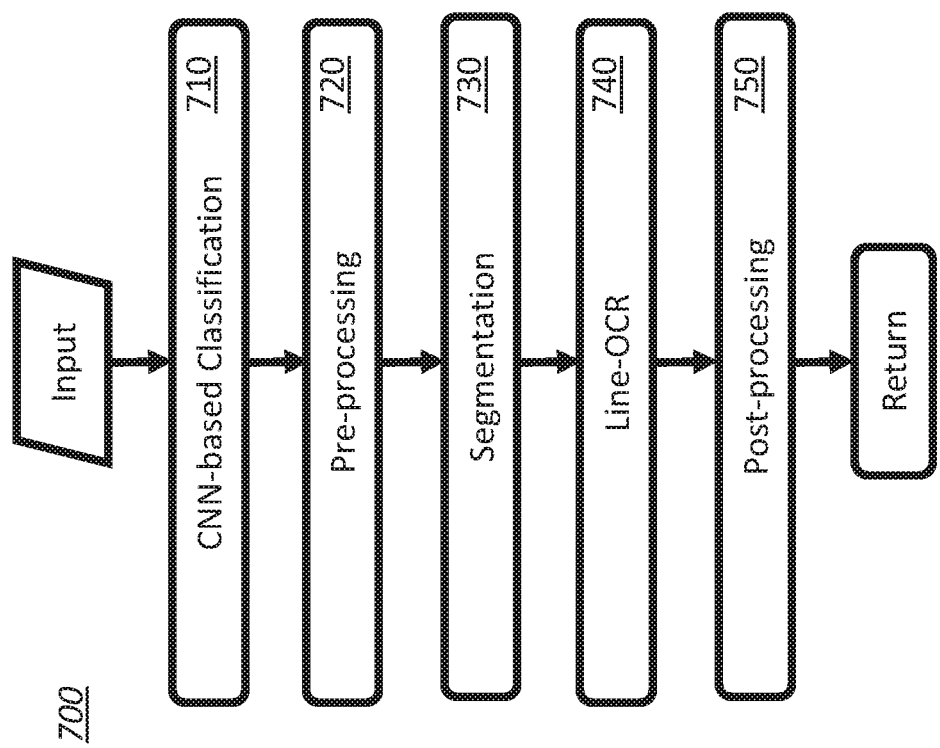
FIG. 7 presents a flow diagram of the second embodiment of the invention.

Another aspect of the invention relates to the second processing pipeline 700 which is shown in FIG. 7.

In one mode of operation, all processed official documents enter the first processing pipeline 600, but selected documents may be switched based on user selection or pre-configured settings to the second processing pipeline 700. In addition, the processing path by which a particular documents is processed, be that following the first processing pipeline 600 to the end, or switching to the second processing pipeline 700 can be made decided according to an assessment made after the image data from the document has been acquired and processed. Alternatively, in one mode of operation, all documents to be processed proceed only via the first processing pipeline 600. In another mode of operation, all documents to be processed proceed only via the second processing pipeline 700. In another alternative embodiment, the selection of documents to switch to the second processing pipeline 700 can be made: (i) by a user, (ii) according to an algorithm based on one or more document characteristics, e.g. the type of document, the size of the document, or document image resolution; (iii) according to operational parameters of the system corresponding to the classification methods, (iv) or randomly.

The second processing pipeline 700 has only one classification method, which is similar to the CNN classifier mentioned previously.

The second processing pipeline 700 comprises the following steps: classifying 710 the document image as comprising a determined document type; pre-processing 720, possibly using knowledge of the determined document type to extract image data from the document image; segmenting 730 the extracted image data to obtain segmentation data; performing OCR 740 on the segmentation data to obtain recognized data; conditioning, or post-processing 750, the recognized data to produce extracted data; and reporting the extracted data.

The step of classifying 710 the document image comprises determining the document type using a CNN, to assign a flag to the document image as being one comprising a document type determined by the CNN.

In a preprocessing step 720, the official document, or a portion of an official document, is located within the image data and the rotation of the official document with the image axis is calculated. The relevant image data is then identified or extracted.

The segmenting step 730 processes the extracted image data to obtain segmentation data to find labels for each keyword in the image data. In other words, it identifies the relevant classification data and its position. Segmenting 730 the extracted image data to obtain segmentation data comprises: searching the extracted image data to find at least one text field; associating a label with each of the at least one text field; obtaining segmentation data from the extracted image data, the segmentation data comprising the position of each of the at least one text field and the associated label; returning the segmentation data. Preferably segmenting the extracted image data to obtain segmentation data comprises uses pixel based segmentation and is thus done in a purely visual way. The segmentation is performed using a deep CNN. This semantic labelling thereby identifies the relevant sections of the document and the reason for their importance.

The relevant sections are then read with a line-OCR step 740 that takes in a crop of a line of text and outputs the text in that image crop. The line-OCR system which performs this step uses further data inputs on document constraints, for example how dates are formatted, specific formatting of document numbers, etc., to provide further certainty on the likely text being returned for a given field. The line-OCR system is a deep convolutional network with LSTM network layers. It has been trained using a connectionist-temporal-classification cost function which is used to perform OCR. Inference is done via a beam-search process.

The step of post-processing 750 involves the classification data being cleaned-up from special pre-defined characters that sometimes occur (dash, apostrophe, etc.) and to format the data in a preferred format (i.e. data to yyyy-mm-dd format).

The CNN classifier of the first processing pipeline 600 and the second processing pipeline 700 are quite similar and the same advantages therefore also apply to the second processing pipeline 700, as in the first processing pipeline 600, which are discussed previously. However, since the other classification methods are not used in the first processing pipeline 600, pipelines two is more accurate and faster due to more performant CNNs. For example, the line-OCR system is trained on a plurality of documents types and can thus generate an associated model for each document type which is used within the pipeline and utilised with the system. This makes the line-OCR system utilised with the invention described herein perform better than a general blind-OCR system.

Further advantages of the second processing pipeline 700 are that every official document passing through it is processed in the same way. This improves predictability of processing times and means that the predictability, performance and stability of a computer using the methods is improved.

Additionally, the second processing pipeline 700 enables data to be more easily labelled by non-experts and the models can be trained automatically for each new document type. In contrast, the first processing pipeline 600 benefits from more involvement from experts to adapt it to account for new documents.

As explained, the pipelines described above, and shown in FIGS. 6 and 7, may in one embodiment be executed by the server 203. The acquired image data may be image data of an official document 500 captured by camera 253 of mobile electronic device 201 that is communicated to the server 203. The mobile electronic device 201 can include an application executable on the device 201 which coordinates the use of the camera 253, the communication of the image data to the server 203, and the reporting on the display 204 of the assessment result reported by the server 203. A user may therefore work the invention via mobile electronic device 201 or, alternatively, via any other user electronic device that is connected to the wireless network 301.

Such user electronic devices 201, 202 are generally termed communication devices and may be a mobile or handheld device, such as a mobile or handheld communication device. It may also have the capability to communicate with other computer systems; for example, via a data link or network, such as a short-range radio frequency link, e.g. Bluetooth, or via a data network, which may be wireless and/or may be connected to the Internet. In certain embodiments, the user electronic device is a multiple-mode communication device configured for both data and voice communication, a mobile telephone, such as a smartphone, a wearable computer such as a watch, a tablet computer, a personal digital assistant, or a computer system such as a notebook, laptop, or desktop system. The user electronic device may take other forms apart from those specifically listed above, for example a fixed location server or a remotely accessed computer system. The user electronic device may also be referred to as a mobile, handheld or portable communications device, a communication device, or a mobile device. In the context of this disclosure, the term "mobile" means the device is of a size or weight which makes it readily portable by a single individual.

The electronic devices 201, 202 may include a controller including a processor 240 (such as a microprocessor) which controls the operation of the electronic device 201, 202. In certain electronic devices 201, 202, more than one processor is provided, typically, with each processor in communication with each other and configured to perform operations in parallel, so that they together control the overall operation of the electronic device. The processor 240 interacts with device subsystems, such as a wireless communication subsystem 211 for exchanging radio frequency, or microwave frequency, signals with a wireless network 301 to perform communication functions. The processor 240 is communicably coupled with additional device subsystems, some of which are shown on FIG. 4, including:

one or more output interfaces 205 (such as one or more of: a display 204, a speaker 256, and an electromagnetic (EM) radiation source 257);

one or more input interfaces 206 (such as one or more of: a camera 253, microphone 258, keyboard, control buttons, a navigational input device, and a touch-sensitive overlay) associated with at least one of a touchscreen 204, an orientation subsystem 249, and memory 244 (such as flash memory, random access memory (RAM), read only memory (ROM), etc.);

auxiliary input/output (I/O) subsystems;

a data port (which may be a serial data port, such as a Universal Serial Bus (USB) data port);

an external video output port;

a near field communications (NFC) subsystem;

a short-range communication subsystem;

a clock subsystem;

a battery interface; and other device subsystems.

Some of the subsystems perform communication-related functions, whereas other subsystems may provide "resident" or on-device functions.

The electronic device 201, 202 stores data 227 in an erasable persistent memory, which in one embodiment is the memory 244. In various embodiments, the data 227 includes service data including information used by the electronic device 201 to establish and maintain communication with the wireless network 301. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, services, applications, games and other commonly stored user information stored on the electronic device 201 by its user. The data 227 may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory) of the electronic device 201 may be organized, at least partially, into one or more databases or data stores.

In at least some embodiments, the electronic device 201, 202 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204.

As noted above, in some embodiments, the electronic device 201, 202 includes a communication subsystem 211 which allows the electronic device 201 to communicate over a wireless network 301. The communication subsystem 211 includes a receiver, a transmitter, and associated components, such as one or more antenna elements 214, local oscillators (LOs) 216, and a processing module such as a digital signal processor (DSP) 217 which is in communication with the processor 240. The antenna elements 214 and 215 may be embedded or internal to the electronic device 201, 202 and a single antenna may be shared by both receiver and transmitter. The particular design of the wireless communication subsystem 211 depends on the wireless network 301 in which electronic device 201, 202 is intended to operate.

In at least some embodiments, the electronic device 201, 202 also includes a device orientation subsystem 249 including at least one orientation sensor which is connected to the processor 240 and which is controlled by one or a combination of a monitoring circuit and operating software. The orientation sensor detects the orientation of the device electronic 201, 202 or information from which the orientation of the electronic device 201, 202 can be determined, such as acceleration. An orientation sensor may generate orientation data which specifies the orientation of the electronic device 201, 202. In various embodiments, the orientation subsystem 249 may include a gravity sensor, a gyroscope, a tilt sensor, an electronic compass or other suitable sensor, or combinations thereof. The device orientation subsystem 249 may include two or more orientation sensors such as an accelerometer and an electronic compass.

The electronic device 201, 202 includes a microphone or one or more speakers. In at least some embodiments, the electronic device 201, 202 includes a plurality of speakers 256. Each speaker 256 may be is associated with a separate audio channel. The multiple speakers may, for example, be used to provide stereophonic sound (which may also be referred to as stereo).

The electronic device 201, 202 may also include one or more cameras 253. The one or more cameras 253 may be capable of capturing images in the form of still photographs or motion video. In at least some embodiments, the electronic device 201, 202 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201, 202 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201, 202 or the housing of the electronic device 201, 202. In such embodiments, the direction of capture of the camera is always predictable relative to the display 204 or the housing. In at least some embodiments, the camera may be provided in a central location relative to the display 204 to facilitate image acquisition of a face. A back facing camera may be used alternatively to, or in addition to, in some embodiments.

In at least some embodiments, the electronic device 201, 202 includes an electromagnetic (EM) radiation source 257. In at least some embodiments, the EM radiation source 257 is configured to emit electromagnetic radiation from the side of the electronic device which is associated with a camera 253 of that electronic device 201, 202. For example, where the camera is a front facing camera 253, the electronic device 201, 202 may be configured to emit electromagnetic radiation from the front face of the electronic device 201, 202. That is, in at least some embodiments, the electromagnetic radiation source 257 is configured to emit radiation in a direction which may visible by the camera. That is, the camera 253 and the electromagnetic radiation source 257 may be disposed on the electronic device 201, 202 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

The electronic device 201, 202 also includes a battery 238 as a power source, which is typically one or more rechargeable batteries that may be charged. The processor 240 operates under stored program control and executes software modules 221 stored in memory such as persistent memory; for example, in the memory 244. The software modules 221 include operating system software 223 and other software applications 225.

The electronic device 201, 202 processor 240 is configured to execute executable code stored in memory, wherein the executable code comprises instructions for performing the method of the present invention. The code can be stored in any suitable memory.

The electronic device 201, 202 can be supplied with the code preinstalled. Alternatively, the code can be loaded by the user or others on to the phone in the ways that are known to the skilled person, such as by data transfer through a USB cable or by downloading the code via a wireless communication. Preinstalling or loading the code is equivalent to installing the code. Preferably, the code is in the form of an application. The application can be provided by a third party application providing service, as is common on modern electronic devices. Code updates may be loaded on to the electronic device 201, 202 in a similar manner.

The code may operate by contacting one or more external systems, such as a server 203, and exchanging data with the external systems. This prevents all the processing, or calculations, having to occur on the electronic device 201, 202 which is useful to spare processing load and thus battery power. The electronic device 201, 202 may use one preferred communication method to exchange data or it may select the optimal communication method in light of those that are available, The selection of communication methods can be adaptive or responsive. By way of non-limiting example, if a wireless network communication signal using the IEEE 802.11 standard (WiFi) is initially available but lost, as the electronic device moves out of WiFi range, the electronic device may switch to a wireless network communication signal using the CDMA200 standard (3G) to continue the data exchange with the server 203. The data may be seamlessly transferred without interruption or the data transfer may pause during the switch over and be restarted thereafter either automatically or by the user.

In some embodiments, all the processing can occur on a user electronic device to prevent the need to contact external systems. This is especially useful if the user electronic device is a portable electronic device that may move into area in that is outside of all useful communications networks, since the functionality of the method is then not dependent of the availability of a communication network. In some cases, the execution of the code may cause the user electronic device to ascertain whether or not a communications network is available and select the operation mode accordingly, the assessment may be ongoing, periodic, or occur a limited number of times.

The code may provide flags, signals, or indications to other applications or services that the user electronic device is equipped with the extra functionality afforded by the present invention. Additionally, the code may be accessible by other applications or services to provide its functionality within the other application and services. For example, once installed the code may flag a financial application that extra security features are installed. The financial application may thus unlock, or enable, more sensitive functions and execute the code, to increase security, when these features are used. An exemplary use of code, which executes in accordance with the present invention, is described below.

Consider a user who wishes to register for a secure service, which requires registered users to be authenticated, this can be achieved via an application (or webpage) accessed via electronic device 201, 202. When the application is first accessed it checks the features and applications loaded onto the electronic device 201, 202 and proceeds to advise the user to install an identification authentication application. It may also direct the user to a location to download the identification authentication application. The user proceeds to download the identification authentication application and load it on to the electronic device 201, 202. When the user returns to the service, the service detects that the identification authentication application is loaded and executes, or calls, the identification authentication application. The identification authentication application then prompts the user, via display 204 or speaker 256, to use the camera 253 to take a photo of an official identification document, possibly using a separate camera application. Once a photo of an official document has been acquired, the identification authentication application sends the image data to a server 203 to extract data. The data extraction uses the process described above, either or both of the first and second processing pipelines 600, 700. The extracted data is then communicated from the server 203 back to the identification authentication application. The identification authentication application then communicates this extracted data to the service. The service knows the identification authentication application provides authentic extracted data. Therefore, the service can use the extracted data to register the new user.

If the server 203 could not extract the data or had low confidence in the extracted data, it may alert the service. Alternatively, it may alert the user and request further images of the official document or request images of alternative official documents.

Additional methods may be used to obtain further user data, such as calling the user to conduct a telephone interview. These additional methods may be performed to increase confidence in the extracted data reported by the identification authentication application.

The following is a list of aspects of the disclosure, and forms part of the description.

Aspect 1. A computer-implemented method for extracting information from an image of a document comprising:
  acquiring an image comprising image data relating to at least a part of the document;
  manipulating the image data to obtain a document image;
  performing optical character recognition of the image data to produce recognized data;
  attempting non-textual classification of the document image by machine recognition of non-textual characters to obtain classification data;
  attempting textual classification of the document image by machine recognition of textual characters to obtain classification data; and
  using the classification data and recognized data to extract information from the image.

Aspect 2. The computer-implemented method of aspect 1, wherein manipulating the image data to obtain a document image comprises applying a transform to the image data.

Aspect 3. The computer-implemented method of aspect 1 or 2, wherein manipulating the image data to obtain a document image comprises cropping the image data to a different size.

Aspect 4. The computer-implemented method of any preceding aspect, wherein the recognized data comprises recognized textual data and recognized positional data.

Aspect 5. The computer-implemented method of aspect 4, wherein the recognized textual data comprises a plurality of textual characters in one or more bounding boxes.

Aspect 6. The computer-implemented method of aspect 4 or 5, wherein the recognized positional data comprises a position to specify each bounding box.

Aspect 7. The computer-implemented method of any preceding aspect, wherein attempting non-textual classification of the document image by machine recognition of non-textual characters to obtain classification data comprises attempting machine readable travel document classification of the document image to obtain classification data.

Aspect 8. The computer-implemented method of aspect 7, wherein machine readable travel document classification comprises:

searching for machine readable zone in the document image; and if a machine readable zone has been found, obtaining classification data from the set of machine readable zone lines using optical character recognition.

Aspect 9. The computer-implemented method of any preceding aspect, wherein attempting non-textual classification of the document image by machine recognition of non-textual characters to obtain classification data comprises attempting machine readable code classification of the document image to obtain classification data.

Aspect 10. The computer-implemented method of aspect 9, wherein machine readable code classification comprises:

searching for a machine readable code segment in the document image; and if at least one machine readable code is found, obtaining classification data from the at least one machine readable code segment.

Aspect 11. The computer-implemented method of any preceding aspect, wherein attempting textual classification of the document image by machine recognition of textual characters to obtain classification data comprises keyword classification of the document image to obtain classification data.

Aspect 12. The computer-implemented method of aspect 11, wherein keyword classification comprises:

obtaining the recognized data;

retrieving a list of template data;

obtaining a weighting matrix using the list of template data;

classifying the document to a determined document type using the list of template data and the weighting matrix; and if a threshold level of confidence in the classification is achieved, obtaining classification data by semantic labelling of the document image.

Aspect 13. The computer-implemented method of aspect 12, wherein the list of template data is formed by a process comprising:

acquiring at least one document template image;

extracting data from each document template image of the at least one document template image, the extracted data comprising an extracted keyword and a position of the extracted keyword; and combining the extracted data associated with each document template image to form the list of template data.

Aspect 14. The computer-implemented method of aspect 12 or 13, wherein the weighting matrix is a term frequency-inverse document frequency weighting matrix characterizing the difference in term frequency of each extracted keyword relative to a corpus.

Aspect 15. The computer-implemented method of aspect 13 or 14, wherein semantic labelling of the document image comprises:

retrieving standard data of the determined document type, the standard data comprising keywords, keyword positions, and expected data patterns;

forming a homography that maps the standard data to the recognized data;

identifying additional classification data in the recognized data using the homography;

filtering the additional classification data by pattern matching using the expected data patterns; and obtaining classification data comprising the filtered additional classification data.

Aspect 16. The computer-implemented method of any preceding aspect, wherein attempting textual classification of the document image by machine recognition of textual characters to obtain classification data comprises convolutional neural network classification of the document image to obtain classification data.

Aspect 17. The computer-implemented method of aspect 16, wherein convolutional neural network classification comprises:

using a deep convolutional neural network to classify the document image as a determined document type; and if a threshold level of confidence in the classification is achieved, obtaining classification data by semantic labelling of the document image.

Aspect 18. The computer-implemented method of any preceding aspect, wherein attempting textual classification of the document image by machine recognition of textual characters to obtain classification data comprises visual classification of the document image to obtain classification data.

Aspect 19. The computer-implemented method of aspect 18 wherein visual classification comprises:

using a visual classifier to classify the document image as a determined document type; and obtaining data classification by semantic labelling of the document image.

Aspect 20. The computer-implemented method of aspect 19, wherein the visual classifier comprises using a bag-of-visual-words model using Kaze features and a support vector machine classifier.

Aspect 21. The computer-implemented method of any preceding aspect, wherein attempting textual classification of the document image by machine recognition of textual characters to obtain classification data is performed if non-textual classification has failed.

Aspect 22. The computer-implemented method of any preceding aspect, wherein attempting non-textual classification of the document image by machine recognition of non-textual characters to obtain classification data comprises, if machine readable travel document classification has failed, attempting machine readable classification of the document image to obtain classification data.

Aspect 23. The computer-implemented method of any preceding aspect, wherein attempting textual classification of the document image by machine recognition of textual characters to obtain classification data comprises attempting at least one of:

keyword classification of the document image to obtain classification data;

convolutional neural network classification of the document image to obtain classification data; and visual classification of the document image to obtain classification data.

Aspect 24. The computer-implemented method of any one of any preceding aspect, wherein attempting textual classification of the document image by machine recognition of textual characters to obtain classification data comprises:

attempting keyword classification of the document image to obtain classification data;

if keyword classification has failed, attempting convolutional neural network classification of the document image to obtain classification data; and if convolutional neural network classification has failed, attempting visual classification of the document image to obtain classification data.

Aspect 25. The computer-implemented method of any preceding aspect, wherein using the classification data to extract information from the image comprises extracting the information that the document in the image as not classified if all attempted classification methods have failed.

Aspect 26. The computer-implemented method of any preceding aspect, wherein the recognized data comprises a machine readable code, such as a barcode, a quick response code or a set of machine readable lines.

Aspect 27. A computer-implemented method for extracting information from an image of a document comprising:
acquiring an image comprising image data relating to at least a part of a document;
classifying the image data as comprising a determined document type;
using knowledge of the determined document type to extract image data from the document image;
segmenting the extracted image data to obtain segmentation data;
performing optical character recognition on the segmentation data to obtain recognized data;
conditioning the recognized data to obtain classification data; and
using the classification data and recognized data to extract information from the image.

Aspect 28. The computer-implemented method of aspect 27, wherein classifying the image data as comprising a determined document type comprises using a deep convolutional neural network to assign the document image as comprising a determined document type.

Aspect 29. The computer-implemented method of aspect 27 or 28, wherein using knowledge of the determined document type to extract image data from the document image comprises:
finding a transform to define a bounding box of a template of the determined document type in the document image.

Aspect 30. The computer-implemented method of aspect 29, wherein the transform comprises a rotation or scaling of the determined document image relative to the document image axes.

Aspect 31. The computer-implemented method of any one of aspects 27 to 30, wherein segmenting the extracted image data to obtain segmentation data comprises:
searching the extracted image data to find at least one text field;
associating a label with each of the at least one text field;
obtaining segmentation data from the extracted image data, the segmentation data comprising the position of each of the at least one text field and the associated label; and
returning the segmentation data.

Aspect 32. The computer-implemented method of aspect 31, wherein segmenting the extracted image data to obtain segmentation data comprises using per pixel based segmentation.

Aspect 33. The computer-implemented method of aspect 31 or 32, wherein segmenting the extracted image data to obtain segmentation data comprises using a deep convolutional neural network.

Aspect 34. The computer-implemented method of any one of aspects 27 to 33, wherein performing optical character recognition on the segmented data comprises:
cropping the image data using the segmentation data;
recognizing text in the cropped image data; and
obtaining recognized data, the recognized data comprising the position of the cropped image data and the recognized text.

Aspect 35. The computer-implemented method of aspect 34, wherein recognizing text in the cropped image data comprises using prior knowledge about the determined document type.

Aspect 36. The computer-implemented method of aspect 34 or 35, wherein recognizing text in the cropped image data comprises using a recognizing network comprising a deep convolutional neural network with long short-term memory network layers on top.

Aspect 37. The computer-implemented method of aspect 36, wherein the recognizing network has been trained with connectionist-temporal-classification as a cost function.

Aspect 38. The computer-implemented method of aspect 37, wherein the recognizing network inference is done via beam-search.

Aspect 39. The computer-implemented method of any one of aspects 27 to 38, wherein conditioning the recognized data comprises removal of special characters.

Aspect 40. The computer-implemented method of any one of aspects 27 to 39, wherein conditioning the recognized data comprises standardizing the format of the elements of the recognized data.

Aspect 41. A computer-implemented method comprising:
a first set of steps as described in any one of aspects 1 to 26; and
a second set of steps as described in any one of aspect 27 to 40, wherein documents are processing according to the first set of steps or, before the step of manipulating the image data to obtain a document image, switched and processed according to the second set of steps.

Aspect 42. The computer-implemented method of any preceding aspect, wherein acquiring an image comprising image data comprises at least one of:
loading a file;
taking a photograph;
scanning an image; and
receiving an image.

Aspect 43. The computer-implemented method of any preceding aspect, wherein if classification data has been obtained and a document type determined, the classification data is validated by a process comprising comparing the classification data with standard data of a document of the determined document type.

Aspect 44. The computer-implemented method of aspect 43, wherein validating the classification data by comparing the classification data with standard data of a document of the determined document type comprises:
summing the number of elements of the classification data;
comparing the number of elements of the classification data to the number of elements of the standard data; and
validating if the number of elements is the same.

Aspect 45. The computer-implemented method of aspect 43 or 44, wherein validating the classification data by comparing the classification data with standard data of a document of the determined document type comprises:
comparing the structure of each of the elements of the classification data to the corresponding element of the standard data using regular expressions; and
validating if the structures are the same.

Aspect 46. The computer-implemented method of any preceding aspect, wherein the computer-implemented method further comprises consistency checking the classification data formed by non-textual classification, and wherein the consistency checking comprises:
optical character recognition of the image data to produce recognized data; and
consistency checking the classification data using the recognized data.

Aspect 47. The computer-implemented method of aspect 46, wherein consistency checking further comprises:

comparing the obtained classification data with the recognized data to ensure they satisfy a threshold of similarity; and if the threshold of similarity is satisfied, declaring the consistency check to be passed.

Aspect 48. The computer-implemented method of aspect 47, wherein the threshold of similarity is that the obtained classification data comprises a set number of elements of the recognized data or a decoded form of the recognized data.

Aspect 49. A computer-readable medium comprising executable instructions for performing the method of any one of preceding aspects.

Aspect 50. A computer comprising a processor configured to execute executable code stored in memory, wherein the executable code comprises instructions for performing the method of any one of preceding aspects.

The present invention may also be operable if the described methods and steps are be rearranged and additional auxiliary process inserted or replaced in the manner that would be known to the skilled person. The scope of protection is therefore defined only by the appended claims.

What is claimed is:

1. A method for extracting information from an image of a document comprising:
    acquiring an image comprising image data relating to at least a part of the document;
    manipulating the image data to obtain a document image;
    performing optical character recognition of the image data to produce recognized data;
    attempting non-textual classification of the document image by machine recognition of non-textual characters to obtain classification data;
    attempting textual classification of the document image by machine recognition of textual characters to obtain classification data; and
    using the classification data and recognized data to extract information from the image;
    wherein attempting textual classification of the document image by machine recognition of textual characters to obtain classification data comprises keyword classification of the document image to obtain classification data, wherein keyword classification comprises:
    obtaining the recognized data;
    retrieving a list of template data;
    obtaining a weighting matrix using the list of template data;
    classifying the document to a determined document type using the list of template data and the weighting matrix; and
    if a threshold level of confidence in the classification is achieved, obtaining classification data by semantic labelling of the document image.

2. The method of claim 1, wherein attempting non-textual classification of the document image by machine recognition of non-textual characters to obtain classification data comprises attempting machine readable code classification of the document image to obtain classification data,
    wherein machine readable code classification comprises:
    searching for a machine readable code segment in the document image; and
    if at least one machine readable code is found, obtaining classification data from the at least one machine readable code segment.

3. The method of claim 1, wherein semantic labelling of the document image comprises:
    retrieving standard data of the determined document type, the standard data comprising keywords, keyword positions, and expected data patterns;
    forming a homography that maps the standard data to the recognized data;
    identifying additional classification data in the recognized data using the homography;
    filtering the additional classification data by pattern matching using the expected data patterns; and
    obtaining classification data comprising the filtered additional classification data.

4. The method of claim 3, wherein the step of filtering the additional classification data by pattern matching using the expected data patterns comprises:
    comparing the additional classification data by pattern matching the data entries of the additional classification data to the expected data patterns to form a data comparison result for each of the data entries;
    flagging the data entries of the additional classification data that have a comparison result that exceeds at least one predefined threshold; and
    correcting or removing the flagged data entries.

5. The method of claim 1, wherein attempting textual classification of the document image by machine recognition of textual characters to obtain classification data is performed if non-textual classification has failed.

6. The method of claim 1, wherein attempting textual classification of the document image by machine recognition of textual characters to obtain classification data comprises attempting at least one of:
    keyword classification of the document image to obtain classification data;
    convolutional neural network classification of the document image to obtain classification data; and
    visual classification of the document image to obtain classification data.

7. The method of claim 1, wherein if classification data has been obtained and a document type determined, or derived from the classification data, the classification data is validated by a process comprising comparing the classification data with standard data of a document of the determined document type.

8. The method of claim 1, wherein the computer-implemented method further comprises consistency checking the classification data formed by non-textual classification, and wherein the consistency checking comprises:
    optical character recognition of the image data to produce recognized data; and
    consistency checking the classification data using the recognized data.

9. The method of claim 1, wherein the step of attempting non-textual classification or the step of attempting textual classification comprises performing the associated classification and recording a result of associated classification.

10. The method of claim 9, wherein the recorded result is marked as a fail if the associated classification did not complete.

11. The method of claim 9, wherein the recorded result is marked as a fail if the obtained classification data does not comprise an expected data pattern or structure associated with a document type that was derived during the associated classification.

12. The method of claim 1, wherein the weighting matrix is a term frequency-inverse document frequency weighting matrix characterizing the difference in term frequency of each extracted keyword relative to a corpus.

13. A method for extracting information from an image of a document comprising:
- acquiring an image comprising image data relating to at least a part of the document;
- manipulating the image data to obtain a document image;
- performing optical character recognition of the image data to produce recognized data;
- attempting non-textual classification of the document image by machine recognition of non-textual characters to obtain classification data;
- attempting textual classification of the document image by machine recognition of textual characters to obtain classification data; and
- using the classification data and recognized data to extract information from the image;
- wherein attempting textual classification of the document image by machine recognition of textual characters to obtain classification data comprises:
- attempting keyword classification of the document image to obtain classification data;
- if keyword classification has failed, attempting convolutional neural network classification of the document image to obtain classification data; and
- if convolutional neural network classification has failed, attempting visual classification of the document image to obtain classification data.

14. A method for extracting information from an image of a document comprising:
- acquiring an image comprising image data relating to at least a part of a document;
- classifying the image data as comprising a determined document type;
- using knowledge of the determined document type to extract image data from the document image;
- segmenting the extracted image data to obtain segmentation data;
- performing optical character recognition on the segmentation data to obtain recognized data;
- post-processing the recognized data to obtain classification data; and
- using the classification data and recognized data to extract information from the image;
- wherein performing optical character recognition on the segmented data comprises: cropping the image data using the segmentation data, recognizing text in the cropped image data, and obtaining recognized data, the recognized data comprising the position of the cropped image data and the recognized text;
- wherein recognizing text in the cropped image data comprises using prior knowledge about the determined document type and using a recognizing network comprising a deep convolutional neural network with long short-term memory network layers on top.

15. The method of claim 14, wherein classifying the image data as comprising a determined document type comprises using a deep convolutional neural network to assign the document image as comprising a determined document type.

16. The method of claim 14, wherein segmenting the extracted image data to obtain segmentation data comprises:
- searching the extracted image data to find at least one text field;
- associating a label with each of the at least one text field;
- obtaining segmentation data from the extracted image data, the segmentation data comprising the position of each of the at least one text field and the associated label; and
- returning the segmentation data.

17. The method of any claim 14, wherein segmenting the extracted image data to obtain segmentation data comprises using a deep convolutional neural network.

* * * * *